United States Patent
Heitz

(10) Patent No.: US 9,964,081 B2
(45) Date of Patent: May 8, 2018

(54) FUEL PUMP SYSTEM FOR BUBBLE CONTROL

(71) Applicant: Hamilton Sundstrand Corporation, Charlotte, NC (US)

(72) Inventor: Steven A. Heitz, Rockford, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 514 days.

(21) Appl. No.: 14/664,027

(22) Filed: Mar. 20, 2015

(65) Prior Publication Data

US 2016/0273500 A1   Sep. 22, 2016

(51) Int. Cl.
*F02M 37/20* (2006.01)
*F02M 37/14* (2006.01)
*F02C 7/232* (2006.01)
*F02C 7/236* (2006.01)
*B01D 19/00* (2006.01)

(52) U.S. Cl.
CPC ......... *F02M 37/20* (2013.01); *B01D 19/0073* (2013.01); *F02C 7/232* (2013.01); *F02C 7/236* (2013.01); *F02M 37/14* (2013.01)

(58) Field of Classification Search
CPC .... F02M 37/20; F02M 37/0052; F02M 37/14; F02M 37/041; F02M 37/046; F02M 37/04; B01D 19/0073; F02C 7/232; F02C 7/236

See application file for complete search history.

(56) References Cited

U.S. PATENT DOCUMENTS

| 3,908,360 | A |   | 9/1975  | Meyer et al. |
| 4,450,820 | A | * | 5/1984  | Haynes ............... F02D 33/006 123/514 |
| 4,589,395 | A |   | 5/1986  | Timms et al. |
| 4,704,070 | A |   | 11/1987 | Iseman |

(Continued)

FOREIGN PATENT DOCUMENTS

| EP | 0325354 A1 | 7/1989 |
| EP | 2492473 A2 | 8/2012 |

(Continued)

OTHER PUBLICATIONS

Extended European Search Report dated Jul. 14, 2016, issued on corresponding European Patent Application No. 16161216.3. (11 pages).

*Primary Examiner* — Jacob Amick
(74) *Attorney, Agent, or Firm* — Locke Lord LLP; Daniel J. Fiorello; Scott D. Wofsy

(57) ABSTRACT

A fuel system includes an air residence chamber operative to receive fuel from a fuel tank and allow degassed air to separate from fuel to an upper portion, and a boost pump including a boost pump inlet and a boost pump outlet. The boost pump inlet is in fluid communication with a lower portion of the air residence chamber to pump fluid from the air residence chamber. The system also includes an accumulator in fluid communication with the boost pump outlet. The accumulator includes a reservoir having a reservoir inlet in fluid communication with the boost pump outlet and a reservoir outlet. The accumulator also includes a piston slidably disposed in the reservoir. The piston is operative to push fluid through the reservoir outlet when a pump pressure of the boost pump drops below a predetermined pressure value.

12 Claims, 1 Drawing Sheet

(56) References Cited

U.S. PATENT DOCUMENTS

| | | | |
|---|---|---|---|
| 4,767,281 A | | 8/1988 | Sailer |
| 4,780,050 A | | 10/1988 | Caine et al. |
| 4,804,313 A | | 2/1989 | Nasvytis |
| 5,020,314 A | * | 6/1991 | Brophy ................. F02C 7/26 60/734 |
| 5,152,271 A | * | 10/1992 | Matsumura ......... F02D 41/3818 123/447 |
| 5,490,387 A | | 2/1996 | Bisson et al. |
| 6,234,128 B1 | * | 5/2001 | Reuss .................... F02M 37/04 123/179.17 |
| 7,578,870 B2 | | 8/2009 | Dean |
| 7,784,448 B2 | | 8/2010 | Murray |
| 2009/0120397 A1 | * | 5/2009 | Prior ................... F02M 55/025 123/179.17 |
| 2014/0165965 A1 | * | 6/2014 | Teets ..................... F02M 69/18 123/447 |
| 2015/0159644 A1 | * | 6/2015 | Jonas ................. F02D 41/3836 417/44.2 |

FOREIGN PATENT DOCUMENTS

| | | | |
|---|---|---|---|
| GB | 1598555 A | 9/1981 | |
| GB | 2158157 A | 11/1985 | |

* cited by examiner

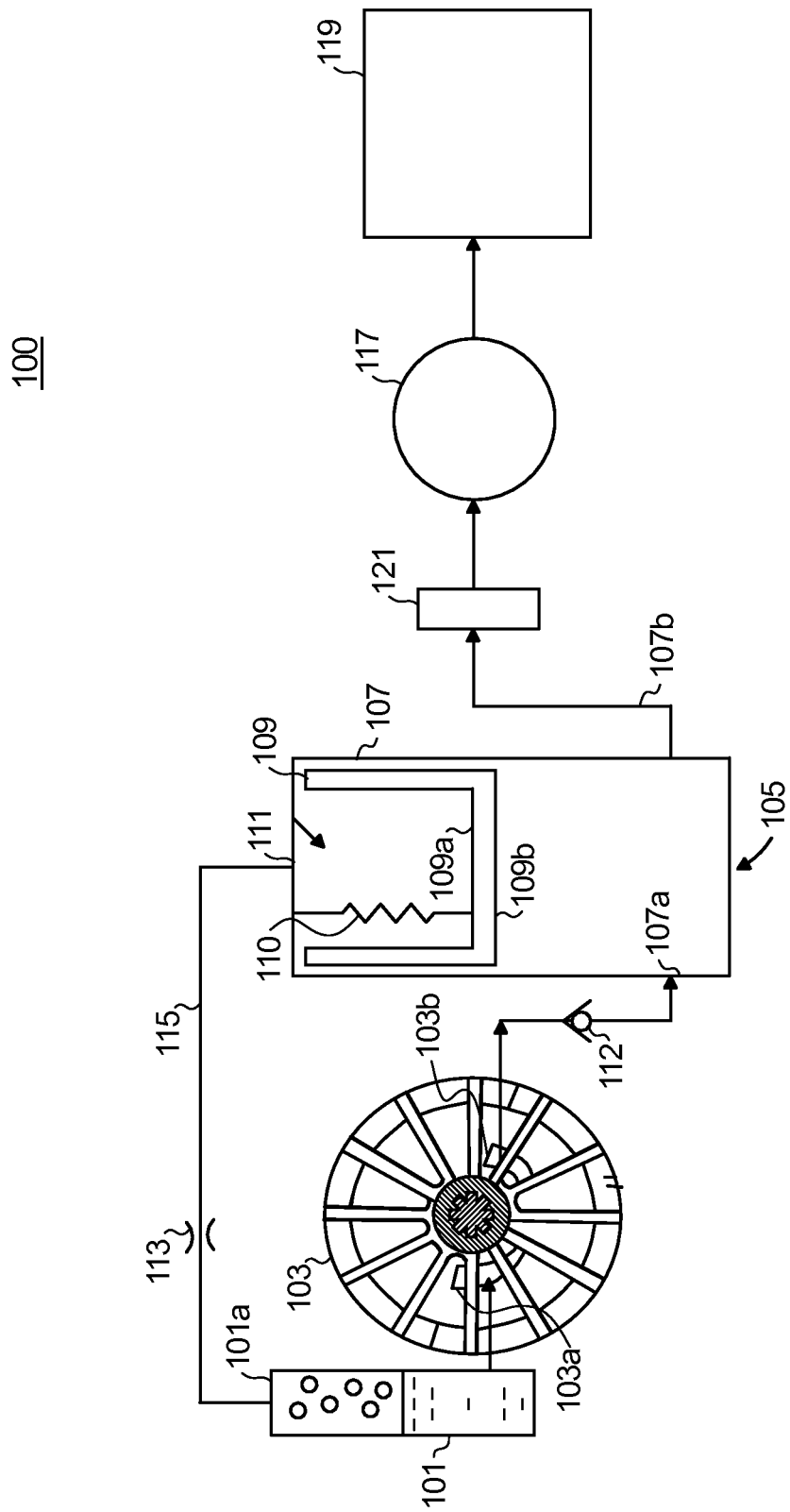

FUEL PUMP SYSTEM FOR BUBBLE CONTROL

BACKGROUND

1. Field

The present disclosure relates to fuel systems, more specifically to bubble control in fuel systems (e.g., helicopters and airplanes for example).

2. Description of Related Art

In certain fuel systems such as helicopter fuel systems, fuel is pulled upward from a fuel tank to the engine systems. This drop in hydrostatic pressure due to change in elevation is in addition to the drop to pressure in the fuel due to the drop attributed to lower atmospheric pressure at altitude during flight. In certain conditions, this can lead to air degassing from the liquid fuel. Such degassing is traditionally handled by an air residence chamber which allows the air that comes out of solution to rise in the air residence chamber to avoid being pulled into a downstream boost pump.

However, certain conditions can cause air bubbles to enter the boost pump. In some flight conditions, the bubbles that are pushed through the pump can reduce the pressure due to the lower density of the fluid mixture entering the pump. Such a bubble causes a pressure loss to occur and the boost pump may no longer supply the downstream components with fuel which can ultimately deprive the engine of the desired amount of input fuel. This scenario can persist as long as air continues to degas from the liquid fuel in the air residence chamber.

Such conventional methods and systems have generally been considered satisfactory for their intended purpose. However, there is still a need in the art for improved fuel systems to control large bubble formation. The present disclosure provides a solution for this need.

SUMMARY

A fuel system includes an air residence chamber operative to receive fuel from a fuel tank and allow degassed air to separate from fuel to an upper portion, and a boost pump including a boost pump inlet and a boost pump outlet. The boost pump inlet is in fluid communication with a lower portion of the air residence chamber to pump fluid from the air residence chamber. The system also includes an accumulator in fluid communication with the boost pump outlet. The accumulator includes a reservoir having a reservoir inlet in fluid communication with the boost pump outlet and a reservoir outlet. The accumulator also includes a piston slidably disposed in the reservoir. The piston is operative to push fluid through the reservoir outlet when a pump pressure of the boost pump drops below a predetermined pressure value.

The system can also include an air bleed in fluid communication with the air residence chamber. A low pressure side of the piston can be in fluid communication with the air bleed and a high pressure side of the piston can be in fluid communication with the reservoir inlet and the reservoir outlet. The piston can be operatively connected to the air residence chamber to draw air from the upper portion of the air residence chamber through the air bleed into a cavity defined between the low pressure side of the piston and the air bleed. The piston can be operative to push air back into the upper portion of the air residence chamber when the pump pressure reaches or exceeds the predetermined pressure value.

The piston can be biased to extend away from the air bleed and toward the reservoir inlet and reservoir outlet, wherein the force of the bias can be overcome by an opposing force resulting from the pump pressure at the predetermined pressure value such that when the pump pressure drops below the predetermined pressure value, the piston actuates toward the reservoir outlet. The piston can be biased with a spring, e.g., disposed on the low pressure side of the piston. It is also contemplated that the piston can be selectively biased using a controller and an actuation mechanism, such that when the pump pressure drops below the predetermined pressure value, the controller causes the actuation mechanism to actuate the piston.

The system can further include a check valve disposed between the pump outlet and the reservoir inlet such that flow can be prevented from flowing backward from the reservoir inlet to the pump outlet.

The system can further include a rate limiting feature disposed between the air bleed and the upper portion of the air residence chamber to control the rate of return of air to the air residence chamber. The rate limiting feature can include a flow constriction in at least one of the air bleed, the upper portion of the air residence chamber, or a flow circuit between the air bleed and the upper portion of the air residence chamber.

The reservoir outlet can be in fluid communication with a gear stage pump that can be operatively connected to a fuel metering unit. A fuel filter can be included downstream of the reservoir outlet.

A method includes pushing a fuel with a piston when a pump pressure from a pump drops below a predetermined value. The method can further include preventing a backward flow by disposing a check valve between the pump and the piston. The method can further include drawing air from an air residence chamber into a chamber above a low pressure side of the piston.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic view of an embodiment of a fuel system in accordance with this disclosure, showing an accumulator operatively connected to a boost pump and an air residence chamber.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a fuel system in accordance with the disclosure is shown in FIG. 1 and is designated generally by reference character 100. The systems and methods described herein can be used to reliably pump fuel in a fuel system susceptible to loss of pumping due to ingestion of large air bubbles.

As shown in FIG. 1, a fuel system 100 includes an air residence chamber 101 operative to receive fuel from a source such as a fuel tank (not shown) and to allow degassed air to separate from fuel to an upper portion 101a of the air residence chamber 101. The air residence chamber 101 can have any suitable shape and can be mounted in an upright position relative to gravity such that gas will rise to the upper portion 101a.

The system 100 includes a boost pump 103 having a boost pump inlet 103a and a boost pump outlet 103b. The boost pump inlet 103a is in fluid communication with the air residence chamber 101 to pump fluid (e.g., fuel and/or a fuel/air mixture) from the air residence chamber 101.

The system 100 also includes an accumulator 105 in fluid communication with the boost pump outlet 103b. The accumulator 105 includes a reservoir 107 having a reservoir inlet 107a in fluid communication with the boost pump outlet 103b. The reservoir 107 also includes a reservoir outlet 107b in fluid communication with one or more downstream components described below.

The accumulator 105 also includes a piston 109 slidably disposed in the reservoir 107. A high pressure side 109b of the piston 109 is in fluid communication with the reservoir inlet 107a and the reservoir outlet 107b.

The reservoir 107 can include an air bleed 111 that is in fluid communication with the upper portion 101a air residence chamber 101. A low pressure side 109a of the piston 109 can be in fluid communication with the air bleed 111. The low pressure side 109a and the high pressure side 109b can be fluidly isolated and/or sealed from each other in any suitable manner (e.g., a suitable O-ring or spring energized Teflon seal).

The piston 109 is operative to push fluid through the reservoir outlet 107b when discharge pressure of the boost pump 103 drops below a predetermined pressure value. At the same time, the piston 109 can draw air from the upper portion 101a of the air residence chamber 101, through the air bleed 111, and into a cavity defined between the low pressure side of the piston 109a and the air bleed 111 as the piston 109 actuates away from the air bleed 111.

The piston 109 can be biased to extend away from the air bleed 111 and toward the reservoir inlet 107a and reservoir outlet 107b. The force of the bias on the piston 109 can be overcome by an opposing force resulting from the pump pressure at the predetermined pressure value such that when the pump pressure drops below the predetermined pressure value, the piston 109 actuates toward the reservoir outlet 107b.

The piston 109 can be biased with a spring 110, e.g., disposed on the low pressure side 109a of the piston 109. It is contemplated that the spring 110 can be disposed on any suitable portion of the piston 109 (e.g., high pressure side 109b). It is also contemplated that the piston 109 can be selectively biased using a controller and an actuation mechanism (e.g., an electromagnetic actuator, mechanical actuator, or the like), such that when the pump pressure drops below the predetermined pressure value, the controller causes the actuation mechanism to actuate the piston 109. Any other suitable biasing device is contemplated herein.

The system 100 can further include a check valve 112 disposed between the pump outlet 103b and the reservoir inlet 107a such that flow is prevented from flowing backward from the reservoir inlet 107a to the pump outlet 103b.

In reverse operation, the piston 109 can be operative to push air back into the upper portion 101a of the air residence chamber 101 when the pump pressure reaches or exceeds the predetermined pressure value. For example, the pressure on the piston 109 can be sufficient at the predetermined pressure value to overcome the bias force of spring 110 and push the piston 109 back toward the air bleed 111.

The system 100 can further include a rate limiting feature 113 disposed between the air bleed 111 and the upper portion 101a of the air residence chamber 101 to control the rate of return of air to the air residence chamber 101 when the piston 109 is being pushed back toward the air bleed 111. While the rate limiting feature is shown as being flow constriction disposed in the flow circuit 115 between the air residence chamber 101 and the air bleed 111, it is contemplated that the rate limiting feature can include a flow constriction in one or more of the air bleed 111, the upper portion 101a of the air residence chamber 101, and/or the flow circuit 115 between the air bleed and the upper portion of the air residence chamber.

The downstream components can include a gear stage pump 117 that is operatively connected to a fuel metering unit (FMU) 119. The gear stage pump 117 is operative to pump fuel to the FMU 119 for input to the engine. The gear stage pump 117 is traditionally mechanically linked to the engine such that the speed of the gear stage pump 117 is related to engine speed (e.g., via a gear system and/or directly).

In certain embodiments, the gear stage pump 117 can be a positive displacement pump whereas the boost pump 103 can be a liquid ring pump. The boost pump 103 helps the gear stage pump 117 operate at engine speeds where the gear stage pump is less efficient (e.g., at start up and/or at low speeds and at high speeds when the gear pump requires a higher fill pressure).

The downstream components can also include a fuel filter 121. The fuel filter 121 can be positioned in any suitable portion of the fuel circuit as described herein. As shown, the fuel filter 121 is disposed upstream of the gear stage pump 117.

Using embodiments of the above described systems, when the boost pump pressure differential drops too low to fill the gear stage pump 117 while pumping a large air bubble, the piston 109 in the accumulator 105 pushes downward and feeds the gear stage pump 117 until the air bubble is completely transferred to the accumulator 105. Simultaneously, a cavity forms behind the piston 109 between the top surface 109 and the air bleed 111 which draws air in from the upper portion 101a of the air residence chamber 101. This reduces the amount of degassed air in the air residence chamber 101 allowing the boost pump 103 receive liquid fuel and to restore normal pumping.

When the boost pump 103 has passed and/or dissipated the bubble and is able to produce normal pump pressure again, the accumulator 105 can slowly push air back to the air residence chamber 101 through the rate limiting feature 113 to be re-absorbed in the fuel that is in the air residence chamber 101.

An embodiment of a method for compensating for a bubble in a fuel system 100 includes fluidly connecting an accumulator 105 to an outlet 103b of a boost pump 103 such that a volume inside of a first portion of the accumulator 105 is reduced in response to a drop in pressure below a predetermined pressure value. The method also includes fluidly connecting the accumulator 105 to an upper portion 101a of an air residence chamber 101 such that degassed air in the upper portion 101a of the air residence chamber 101 will be drawn into a second portion of the accumulator 105 while reducing the volume of the first portion of the accumulator 105.

The method can include disposing a check valve 112 between the accumulator 105 and the boost pump 103 such that backward flow is prevented from the accumulator 105 to the boost pump 103. The method can include disposing a flow rate limiting feature 113 between the accumulator 105 and the upper portion 101a of the air residence chamber 101. Disposing a flow rate limiting feature 113 can include disposing a flow constriction in a flow circuit 115 between the accumulator 105 and the upper portion 101a of the air residence chamber 101.

Another embodiment of a method in accordance with this disclosure can include pushing a fuel with a piston 109 when a pump pressure from a pump 103 drops below a predetermined value. The method can further include preventing a backward flow by disposing a check valve 112 between the pump 103 and the piston 109. The method can further include drawing air from an air residence chamber 101 into a chamber above a low pressure side 109a of the piston 109.

The methods and systems of the present disclosure, as described above and shown in the drawings, provide for a fuel system with superior properties including reliable pumping in the condition where air bubbles form in the fuel circuit. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A fuel system, comprising:
   an air residence chamber operative to receive fuel from a fuel tank and allow degassed air to separate from fuel to an upper portion;
   a boost pump including a boost pump inlet and a boost pump outlet, wherein the boost pump inlet is in fluid communication with the air residence chamber to pump fluid from the air residence chamber;
   an accumulator in fluid communication with the boost pump outlet, the accumulator including:
      a reservoir including a reservoir inlet in fluid communication with the boost pump outlet and a reservoir outlet; and
      a piston slidably disposed in the reservoir, wherein a high pressure side of the piston is in fluid communication with the reservoir inlet and the reservoir outlet, wherein the piston is operative to push fluid through the reservoir outlet when a pump pressure of the boost pump drops below a predetermined pressure value;
   further including an air bleed in fluid communication with the air residence chamber, wherein a low pressure side of the piston is in fluid communication with the air bleed and draws air from the upper portion of the air residence chamber through the air bleed into a cavity defined between the low pressure side of the piston and the air bleed.

2. The system of claim 1, wherein the piston is biased to extend away from the air bleed and toward the reservoir inlet and reservoir outlet, wherein the force of the bias is overcome by an opposing force resulting from the pump pressure at the predetermined pressure value such that when the pump pressure drops below the predetermined pressure value, the piston actuates toward the reservoir outlet.

3. The system of claim 2, wherein the piston is biased with a spring.

4. The system of claim 3, wherein the spring is disposed on the low pressure side of the piston.

5. The system of claim 2, wherein the piston is selectively biased using a controller and an actuation mechanism, such that when the pump pressure drops below the predetermined pressure value, the controller causes the actuation mechanism to actuate the piston.

6. The system of claim 1, further including a check valve disposed between the pump outlet and the reservoir inlet such that flow is prevented from flowing backward from the reservoir inlet to the pump outlet.

7. The system of claim 1, wherein the piston is operative to push air back into the upper portion of the air residence chamber when the pump pressure reaches or exceeds the predetermined pressure value.

8. The system of claim 7, further comprising a rate limiting feature disposed between the air bleed and the upper portion of the air residence chamber to control the rate of return of air to the air residence chamber.

9. The system of claim 8, wherein the rate limiting feature includes a flow constriction in at least one of the air bleed, the upper portion of the air residence chamber, or a flow circuit between the air bleed and the upper portion of the air residence chamber.

10. The system of claim 1, wherein the reservoir outlet is in fluid communication with a gear stage pump that is operatively connected to a fuel metering unit.

11. The system of claim 1, further including a fuel filter disposed downstream of the reservoir outlet.

12. A method,
   including pushing a fuel with a piston when a pump pressure from a pump drops below a predetermined value;
   further including preventing a backward flow by disposing a check valve between the pump and the piston;
   further including drawing air from an air residence chamber into a chamber above a low pressure side of the piston.

* * * * *